US010483735B1

(12) United States Patent
Gretz et al.

(10) Patent No.: US 10,483,735 B1
(45) Date of Patent: Nov. 19, 2019

(54) NINETY DEGREE SNAP FIT ELECTRICAL FITTING FOR CONNECTION OF ELECTRICAL CABLES TO AN ELECTRICAL BOX

(71) Applicant: Arlington Industries, Inc., Scranton, PA (US)

(72) Inventors: Thomas J. Gretz, Port St. Lucie, FL (US); Daniel O'Neil, Moscow, PA (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 93 days.

(21) Appl. No.: 14/675,904

(22) Filed: Apr. 1, 2015

Related U.S. Application Data (60) Provisional application No. 61/973,389, filed on Apr. 1, 2014.

(51) Int. Cl.
| | |
|---|---|
| *H02G 3/06* | (2006.01) |
| *H02G 1/08* | (2006.01) |
| *H02G 3/22* | (2006.01) |
| *H02G 3/08* | (2006.01) |
| *H01R 13/58* | (2006.01) |

(52) U.S. Cl.
CPC ............ *H02G 3/0633* (2013.01); *H02G 1/08* (2013.01); *H02G 3/065* (2013.01); *H01R 13/58* (2013.01); *H01R 13/5812* (2013.01); *H02G 3/0616* (2013.01); *H02G 3/0675* (2013.01); *H02G 3/0683* (2013.01); *H02G 3/0691* (2013.01); *H02G 3/083* (2013.01); *H02G 3/085* (2013.01); *H02G 3/088* (2013.01); *H02G 3/22* (2013.01)

(58) Field of Classification Search
CPC ........ H02G 3/0633; H02G 3/065; H02G 3/22; H02G 3/083; H02G 3/085; H02G 3/088; H02G 3/0616; H02G 3/0683; H02G 1/08; H02G 3/0675; H02G 3/0691; H01R 13/58; H01R 13/5812; H01R 13/5833
See application file for complete search history.

(56) References Cited

U.S. PATENT DOCUMENTS

| | | | | |
|---|---|---|---|---|
| 6,932,390 B1 * | 8/2005 | Gretz | ............ | F16L 27/0837 285/181 |
| 7,854,627 B1 * | 12/2010 | Gretz | ............ | 439/557 |
| 2002/0125033 A1 * | 9/2002 | Blake | ............ | H02G 3/18 174/653 |
| 2007/0045004 A1 * | 3/2007 | Kiely | ............ | H02G 3/0691 174/666 |
| 2007/0278006 A1 * | 12/2007 | Gardner | ............ | H01R 24/564 174/659 |
| 2011/0309611 A1 * | 12/2011 | Smith | ............ | F16L 5/06 285/139.3 |

\* cited by examiner

*Primary Examiner* — Steven T Sawyer
*Assistant Examiner* — Paresh H Paghadal (57) ABSTRACT

A ninety degree snap fit electrical fitting for enabling rapid snap-fit insertion of an electrical cable to an electrical box. The ninety degree snap fit electrical fitting includes a connector body having a leading end, a trailing end, an internal bore, a box connection arrangement on the leading end, and a cable connection arrangement on the trailing end. A seat on the leading end of the connector body includes a snap ring with an outward extending locking tang. An internal snap ring is secured within the internal bore of the connector body at the trailing end. A cable retaining tang on the internal snap ring is adapted to engage and secure an electrical cable to the trailing end of the connector body.

4 Claims, 8 Drawing Sheets

NINETY DEGREE SNAP FIT ELECTRICAL FITTING FOR CONNECTION OF ELECTRICAL CABLES TO AN ELECTRICAL BOX

This application claims the priority of Provisional U.S. Patent Application Ser. No. 61/973,389 filed Apr. 1, 2014.

FIELD OF THE INVENTION

The present invention relates to electrical boxes and specifically to electrical fittings for securing electrical cables to electrical boxes and panels.

BACKGROUND

Quick-connect fittings are commonly used to rapidly connect electrical cables with electrical boxes. The quick connect fittings usually include a straight-line bore within the body of the fitting which allows easy insertion of an electrical cable through the straight-line bore.

There are times however, when there is little available space around an electrical box for straight-line connection of an electrical cable thereto. In such a situation, an electrical fitting that enables a 90-degree bend of the electrical cable is sometimes preferred as it requires less available space around the electrical box and allows an installer to more easily connect an electrical cable to the box.

Some ninety-degree quick-connect electrical fittings have been proposed, but their internal bore commonly includes a substantially tight 90-degree bend through which it is difficult to pass the inserted electrical cable. Moreover, prior art ninety-degree fittings typically include tangs which are designed to grasp and hold the inserted cable but typically direct the inserted cable to the inside 90-degree elbow or bend of the ninety-degree passageway within the fitting. Unfortunately, directing the cable around the inside bend of the fitting makes it very difficult to insert and pass the electrical cable through the fitting. As a result of the placement and orientation of the tangs, it is difficult to push electrical cables though the internal bore or passageway. As a further disadvantage, the connector bodies of currently available ninety-degree quick-connect electrical fittings also are typically produced in two pieces, which drives up the fabrication costs of the fitting.

Accordingly, what is needed is an improved ninety-degree quick-connect electrical fitting which allows easy insertion of electrical cables through the internal passageway of the connector while still enabling a ninety degree bend in the cable. More preferably, the ninety-degree quick-connect electrical fitting should be constructed of a one-piece connector body. Furthermore, the ninety-degree quick-connect electrical fitting should include tangs which direct the inserted cable toward the outside bend of the internal ninety degree passageway within the fitting.

BRIEF SUMMARY OF THE INVENTION

The current invention is a ninety degree snap fit electrical fitting for enabling rapid snap-fit insertion of an electrical cable to an electrical box. The ninety degree snap fit electrical fitting includes a connector body having a leading end, a trailing end, an internal bore, a box connection arrangement on the leading end, and a cable connection arrangement on the trailing end. A seat on the leading end of the connector body includes a snap ring with an outward extending locking tang. An internal snap ring is secured within the internal bore of the connector body at the trailing end. A cable retaining tang on the internal snap ring is adapted to engage and secure an electrical cable to the trailing end of the connector body.

OBJECTS AND ADVANTAGES

A first object of the current invention is to provide an electrical fitting that enables easy snap-in insertion of an electrical cable into an electrical box, including easy snap-in insertion of an electrical cable at the trailing end of the fitting and easy snap-in insertion of the leading end of the fitting into the knockout of the electrical box.

When wiring residences, it is common to have limited space available along the sides of the electrical box in which wiring access holes or knockouts are available. The electrical fitting of the current invention, as a result of the 90° bend in the fitting body, enables connection of cables in limited spaces by turning the wiring leads of the inserted electrical cable at essentially 90° but with a gentle bend radius with respect to the axis of the electrical cable.

A further object of the current invention is to provide an electrical fitting that will accommodate a wide range of electrical cable sizes.

A yet further object of the current invention is to provide an electrical fitting that will accommodate a wide variety of electrical cables, including AC, MC, HCF, MC continuous corrugated aluminum cable, MCI-A cables, both steel and aluminum, AC90 and ACG90 cables.

A further object is to provide a fully assembled electrical fitting and is ready to use.

A further object is to provide an electrical fitting that enables rapid connection of an electrical cable to an electrical box without the use of tools.

Another object is to provide an electrical fitting that provides a very secure connection of an electrical cable to the electrical box, without any chance of pullout.

A further object is to provide an electrical fitting that thoroughly grounds the electrical cable to the box and thereby provides electrical continuity between the cable, the fitting, and the box.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
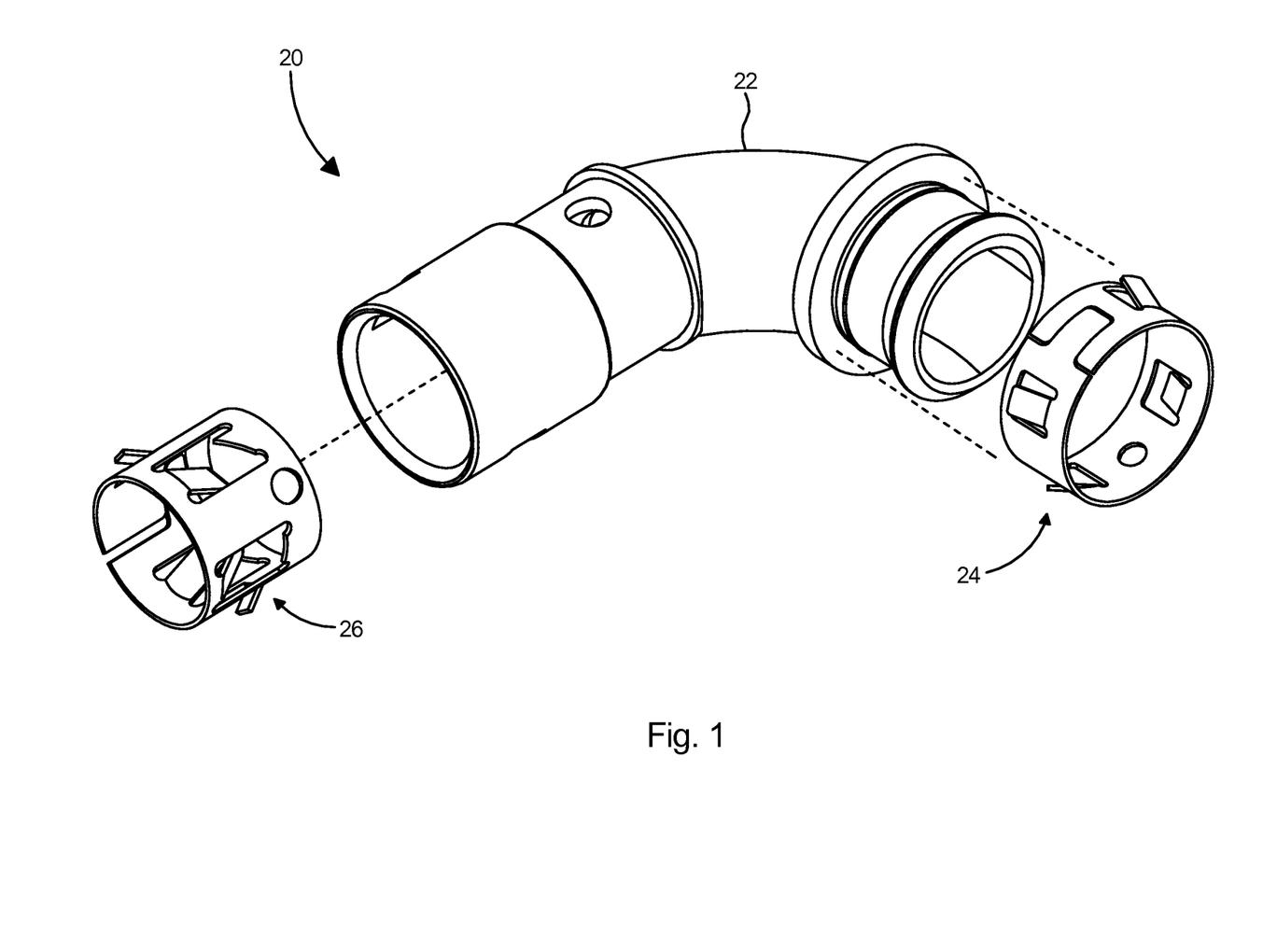
FIG. 1 is an exploded isometric view of a ninety degree snap fit electrical fitting in accordance with embodiments of the invention.

With reference to FIG. 1, the present invention comprises a ninety degree snap fit electrical fitting 20 for connecting an electrical cable to an electrical box. The ninety degree snap fit electrical fitting 20 includes a connector body 22, a snap ring 24, and an internal snap ring 26.

Figure 2:
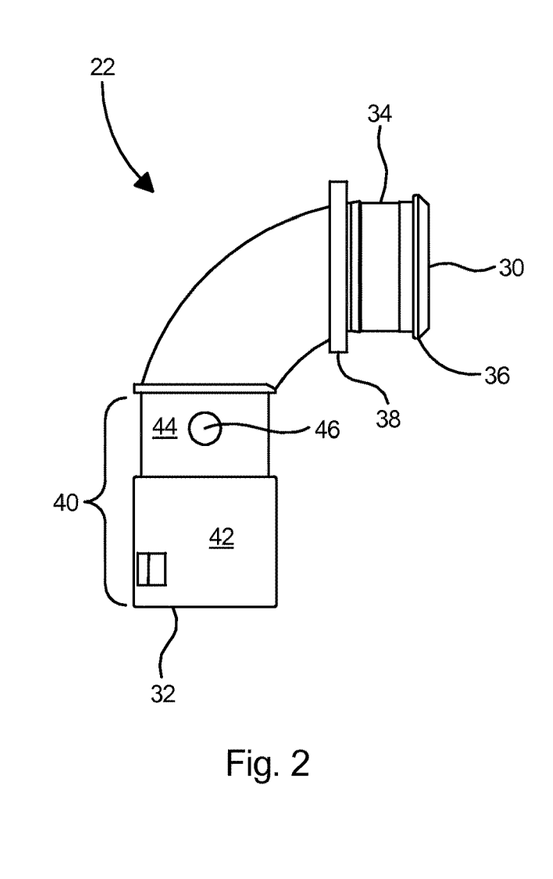
FIG. 2 is a side view of a connector body which forms a portion of the ninety degree snap fit electrical fitting of FIG. 1.
Figure 3:
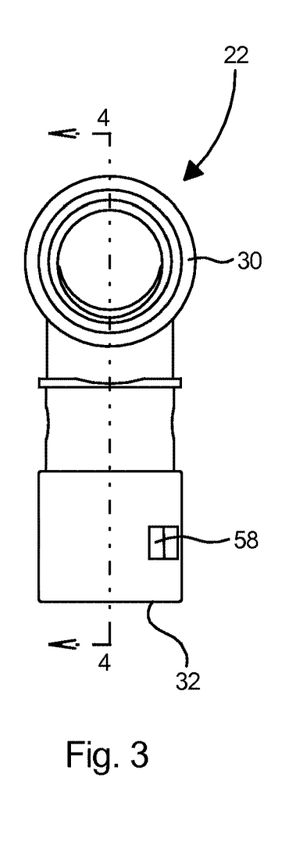
FIG. 3 is an elevation view of the connector body as viewed from the left side of FIG. 2.
Figure 4:
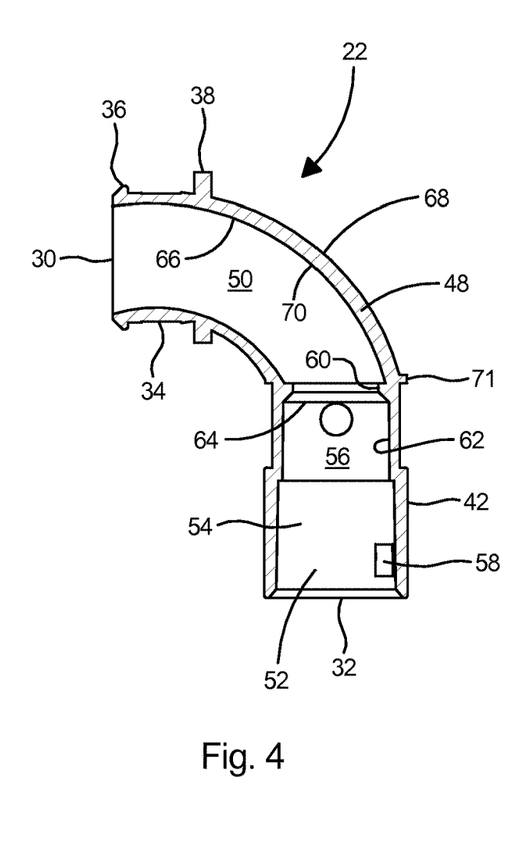
FIG. 4 is a sectional view of the connector body taken along line 4-4 of FIG. 2.

Referring to FIGS. 2-4, the connector body 22 includes a leading end 30 and a trailing end 32. A portion of the connector body 22 is necked-down on the leading end 30 to form a reduced-diameter seat 34. Reduced diameter seat 34 is bounded by a leading flange 36 and a trailing flange 38. The trailing end 32 of connector body 22 includes a short straight leading end portion 40 with an outer portion 42 and an inner portion 44. Outer portion 42 is of a larger diameter than inner portion 44. Inner portion 44 includes a view-hole 46 therein. Leading end 30 as used herein refers to the end of the electrical fitting or connector body 22 that will be connected to an electrical box and trailing end 32 as used herein refers to the end of the electrical fitting or connector body 22 to which an electrical cable will be connected.

As shown in FIG. 4, hollow connector body 22 includes a sidewall 48 and an internal bore 50 or passageway therein. The outer portion 42 of connector body 22 at trailing end 32 includes an inlet bore 52, an outlet bore 53, and a first inlet chamber 54. Outer portion 42 further includes a second inlet chamber 56 adjacent the first inlet chamber 54. Second inlet chamber 56 is of smaller diameter than the first inlet chamber 54. Outer portion 42 includes one or more openings 58 therein. An internal shoulder 60 extends around the inner periphery 62 of the connector body 22 at the interior end 64 of the second inlet chamber 56. Connector body 22 includes smooth inner walls 66 that include a 90-degree elbow 68 or bend having a gentle bend radius. Smooth inner walls 66 include an outside bend 70 that redirects the internal passageway by 90 degrees. Connector body 22 further includes an outer flange 71 extending from a portion of the outer surface of the connector body 22, with the outer flange extending from the outside bend portion of the outer surface.

Figure 5:
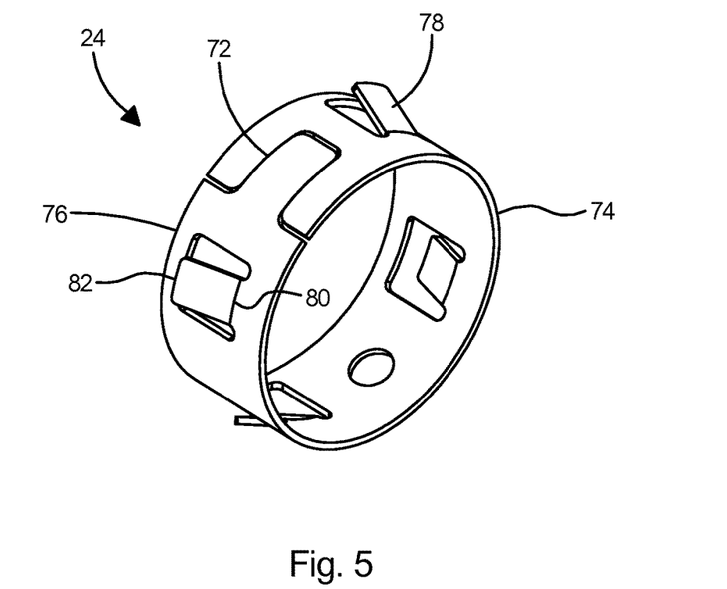
FIG. 5 is an isometric view of a snap ring that forms a portion of the ninety degree snap fit electrical fitting of FIG. 1.

With reference to FIG. 5, the snap ring 24 is a split ring that includes a split 72, a leading end 74, a trailing end 76, and one or more locking tangs 78 bent outward from the split ring. The locking tangs 78 include a cantilevered end 80 and a free end 82. Free end 82 is oriented toward the trailing end 76 of the snap ring. The split 72 between the two ends of the snap ring 24 enable the split ring to expand when force is applied to urge the ring to a wider diameter.

Figure 6:
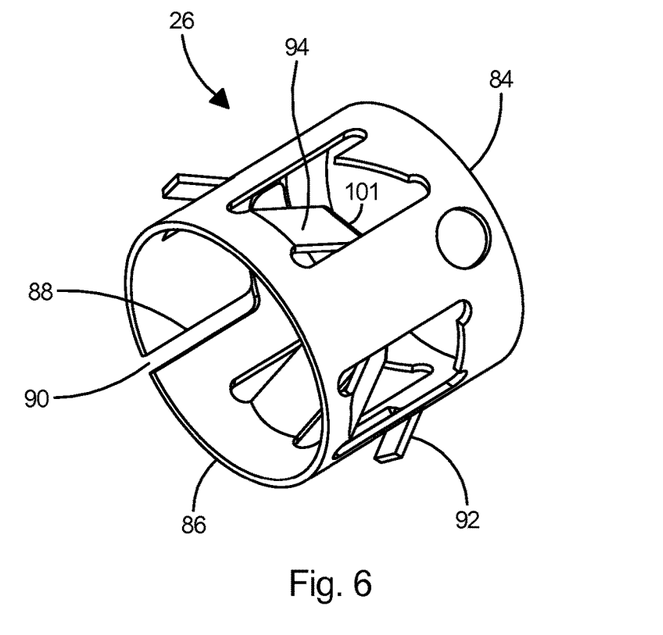
FIG. 6 is an isometric view of an internal snap ring that forms a portion of the ninety degree snap fit electrical fitting of FIG. 1.

As shown in FIG. 6, internal snap ring 26 includes a leading end 84, a trailing end 86, and a split 88 therein. The internal snap ring 26 includes a gap 90 at the split to enable the internal snap ring to compress when force is applied to urge the ring to a smaller diameter. The internal snap ring 26 further includes locking tangs 92 that are bent outward of the ring and cable retaining tangs 94 that are bent inward of the ring. Locking tangs 92 include free ends 96 that are oriented toward the leading end 84 and cable retaining tangs 94 include free ends 101 that are oriented toward the trailing end 86 of the internal snap ring 26.

Figure 7:
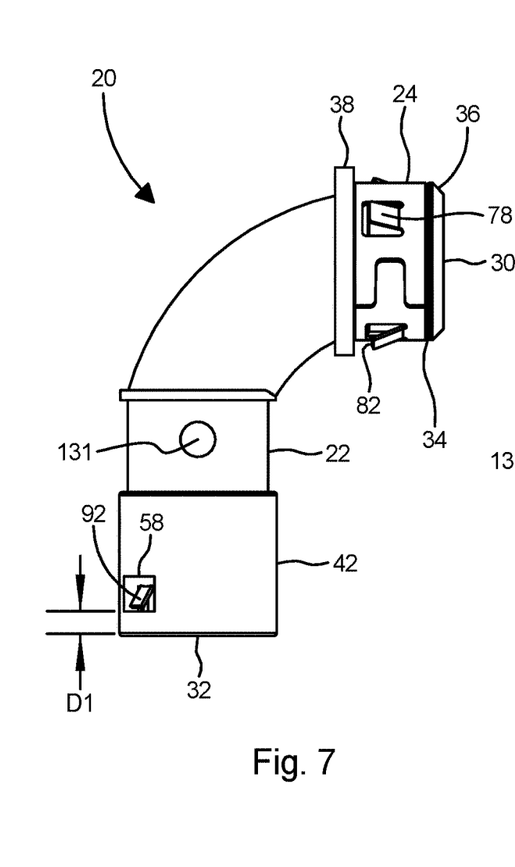
FIG. 7 is a side view of the ninety degree snap fit electrical fitting of FIG. 1.
Figure 8:
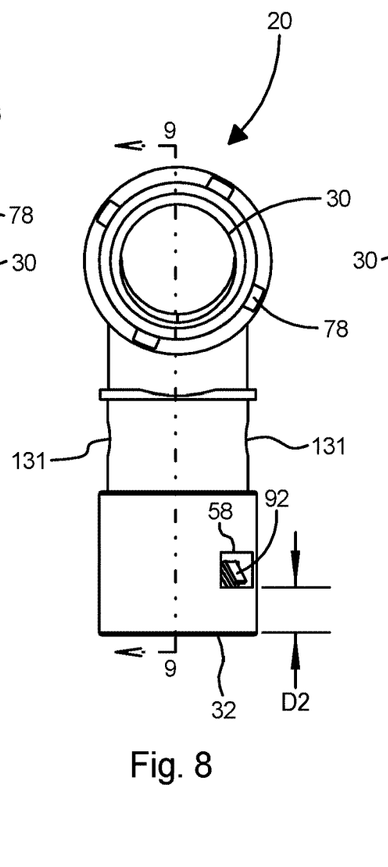
FIG. 8 is an elevation view of the ninety degree snap fit electrical fitting as viewed from the left side of FIG. 7.
Figure 9:
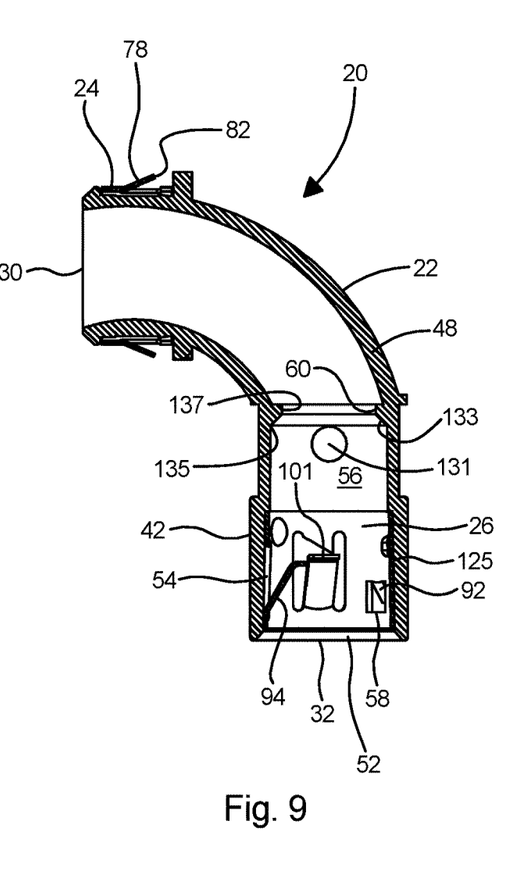
FIG. 9 is a sectional view of the ninety degree snap fit electrical fitting taken along line 9-9 of FIG. 7.

Referring to FIGS. 7-9, the ninety degree snap fit electrical fitting 20 is an assembly of the connector body 22, the snap ring 24, and the internal snap ring 26. The snap ring 24, being a split ring constructed of resilient metal such as spring steel, is expanded and pressed onto the seat 34 at the leading end 30 of the connector body 22, after which the ring relaxes to its unbiased diameter and resides on the seat 34. After being seated on the leading end 30 of the connector body, the locking tangs 78 are oriented with their free ends 82 oriented toward the trailing flange 38 of connector body.

The internal snap ring 26, being a split ring constructed of resilient metal such as spring steel, is compressed and pressed into the first inlet chamber 54 at the trailing end 32 of the connector body 22, after which the internal snap ring 26 expands outward to it unbiased diameter. The outward directed locking tangs 92 extend through openings 58 in the outer portion 42 of the connector body 22 and retain the internal snap ring 26 within the first inlet chamber 54 at the trailing end 32 of the connector body 22. As shown in FIG. 9, the free ends 101 of the cable retaining tangs 94 include extend into the bore or passageway 56 of the connector body. As shown in FIGS. 7 and 8, the ninety degree snap fit electrical fitting 20 preferably includes two outward directed locking tangs 92 on the internal snap ring 26 and two complementary openings 58 in the connector body 22. The openings are offset at different distances D1 and D2 from the trailing end 32 of the fitting. As a result, insertion of the internal snap ring 26 into the connector body 22 orients the internal snap ring 26 with respect to the connector body.

Figure 10:
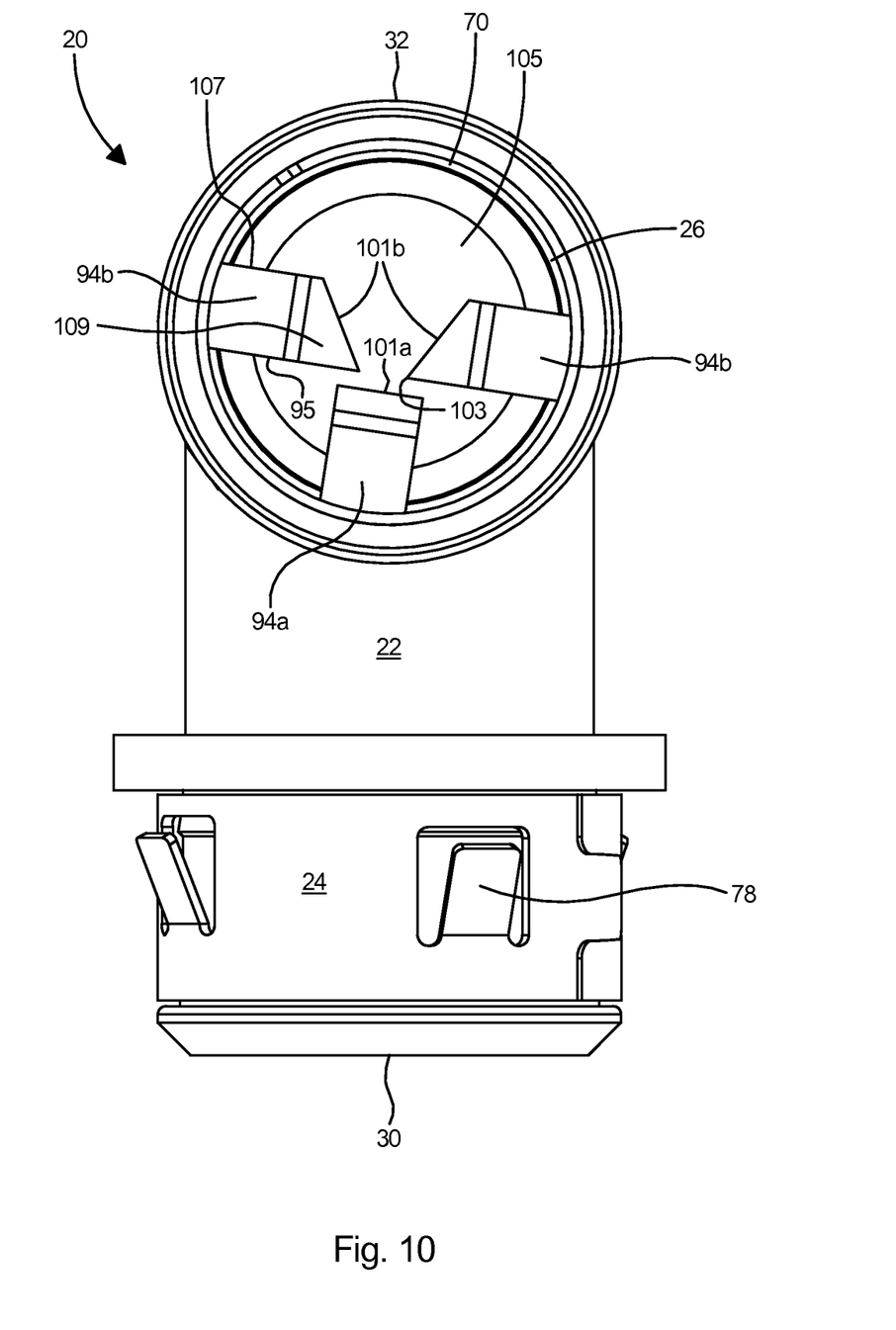
FIG. 10 is an end view of the ninety degree snap fit electrical fitting from the trailing end.

As shown in FIG. 10, the internal snap ring 26 preferably includes three cable retaining tangs which include a pusher tang 94a and two centering tangs 94b. The free end 101a of pusher tang 94a is preferably flat and the free ends 101b of the centering tangs 94b are preferably at an angle with respect to the edge 95 of the tang 94b, thus an electrical cable inserted within the trailing end 32 of the ninety degree snap fit electrical fitting 20 will be pushed or directed toward the outside bend 70 (see FIG. 4) of the fitting. The point 103 of the centering tangs 94b is adjacent the pusher tang 94a, thus creating an open area 105 toward the outside bend 70 of the fitting. The resistive force applied by the cable retaining tangs 94a and 94b against an electrical cable as it is inserted therein acts to push or direct the electrical cable (not shown) toward the outside bend 70. Directing the cable toward the outside bend 70 provides a substantial advantage over prior art 90-degree fittings, as the prior art fittings typically do not direct the cable in any particular direction. As a result, insertion of a cable within a prior art 90-degree fitting typically causes the cable to follow the inside bend 106 (see FIG. 13) of the fitting thereby causing the cable to jam inside the fitting. All of the cable retaining tangs 94a and 94b include a base portion 107 and an end portion 109 that is bent away from the base portion.

Figure 11:
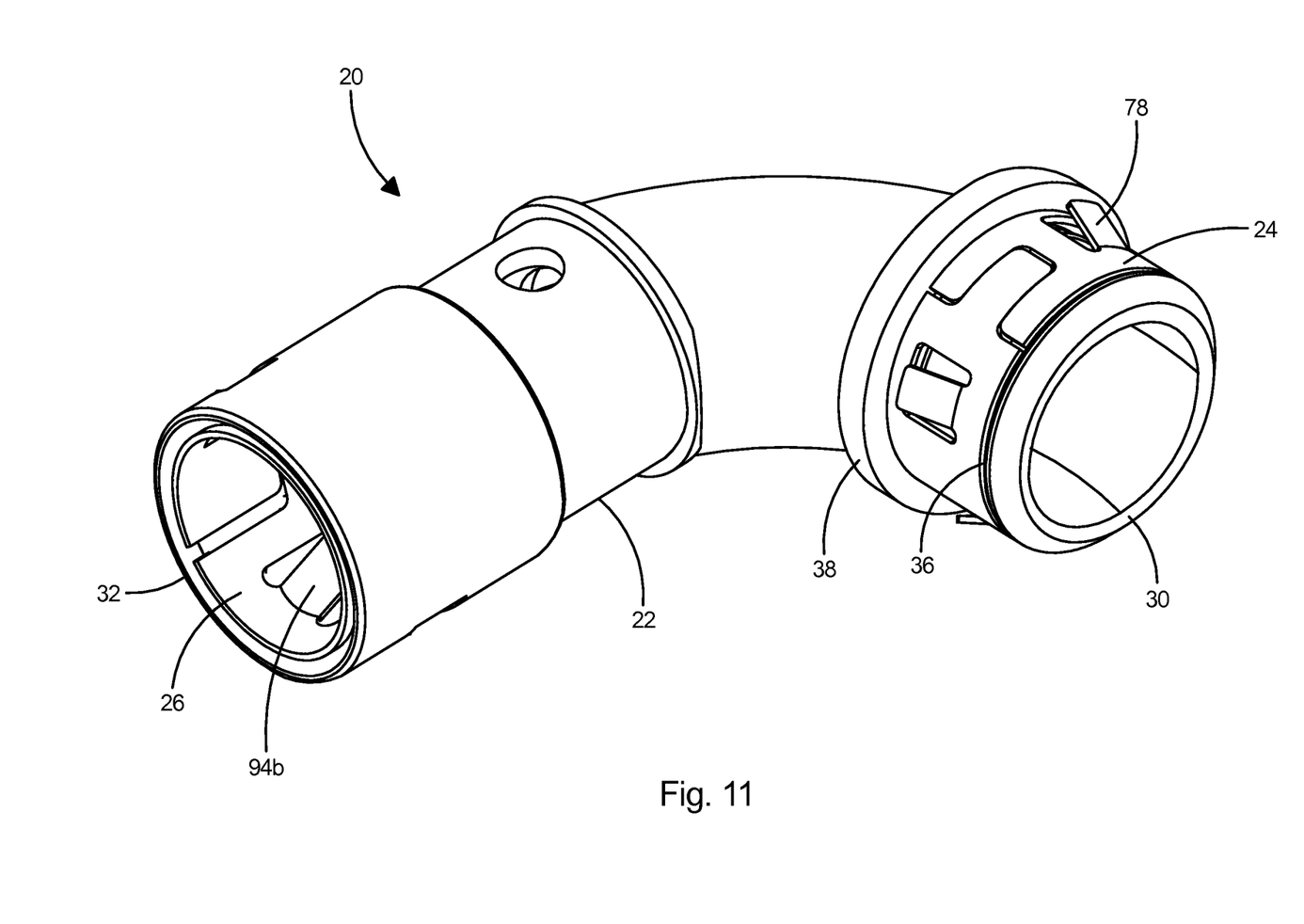
FIG. 11 is an isometric view of a ninety degree snap fit electrical fitting in accordance with embodiments of the invention.

With reference to FIG. 11, the ninety degree snap fit electrical fitting 20 is an assembly of the connector body 22, the snap ring 24, and the internal snap ring 26. Snap ring 24 and internal snap ring 26 are most preferably constructed of spring steel. Connector body 22 most preferably is die-cast of metal. The ninety degree snap fit electrical fitting 20 is operated by snapping the leading end 30 into a knockout of an electrical box (not shown) and inserting an electrical cable (not shown) into the trailing end 32 of the connector body 22. The ninety degree snap fit electrical fitting 20 provides good electrical continuity between the electrical cable, the electrical box, and the fitting 20 itself including the snap ring 24, the internal snap ring 26, and the connector body 22.

Figure 12:
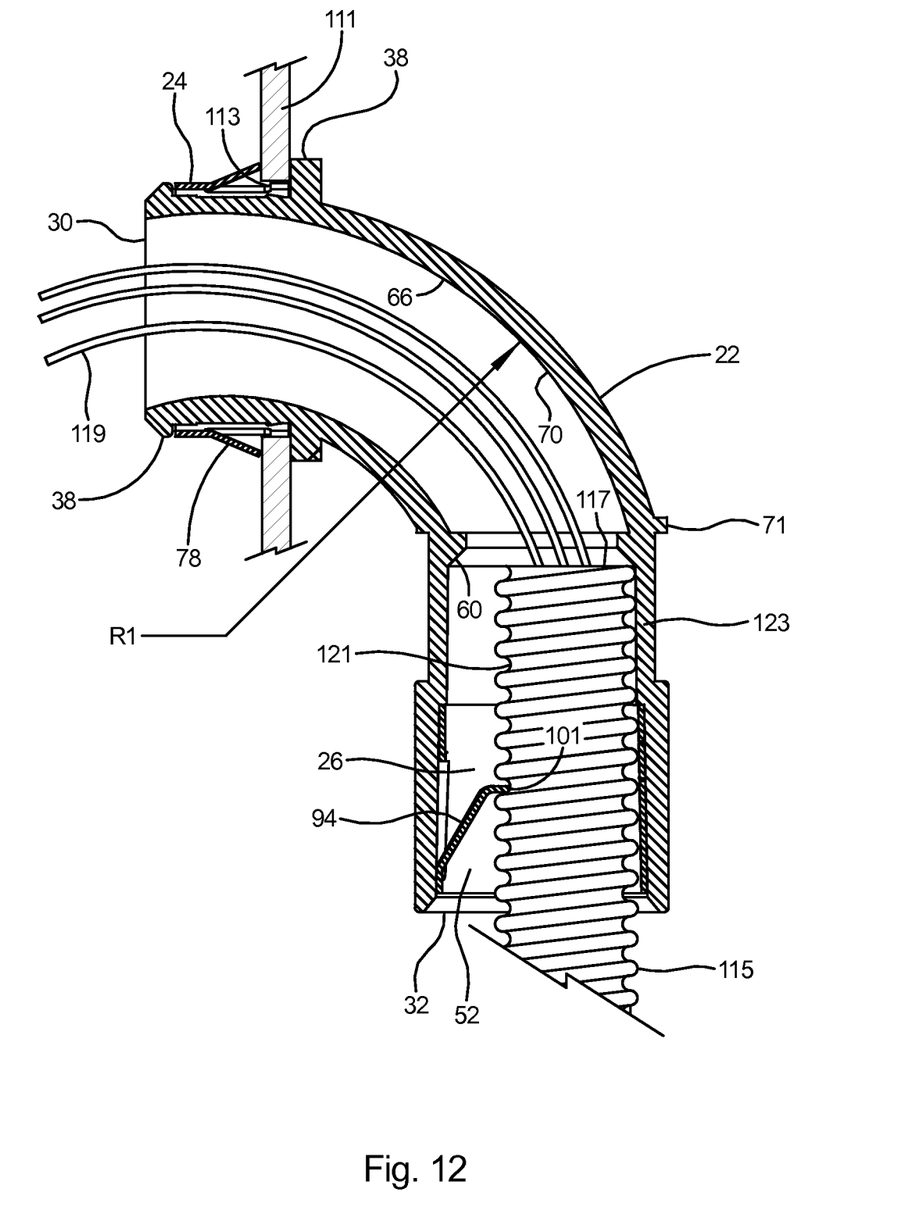
FIG. 12 is a sectional view of the ninety degree snap fit electrical fitting taken along line 9-9 of FIG. 7 and showing the leading end of the fitting secured to an electrical box and an electrical cable secured to the trailing end of the fitting.

Reference is made to FIG. 12 for an understanding of the operation of the present invention. The ninety degree snap fit electrical fitting 20 is used to connect and ground an electrical cable to an electrical box or panel and is particularly useful in tight areas around electrical boxes where there is little space for straight-in attachment of an electrical cable.

As shown in FIG. 12, to connect the leading end 30 of the ninety degree snap fit fitting 20 to an electrical box 111, the installer simply presses the leading end 30 into a knockout hole 113 in the electrical box. Locking tangs 78 of snap ring 24 simply flex inwards as the fitting is advanced into the hole 113 of the box 111 and snap outward to their unbiased position as the tangs 78 clear the wall of the electrical box. The locking tangs 78 maintain the trailing flange 38 of the fitting 20 tightly against the electrical box 111 thereby establishing good electrical continuity between the box and the fitting 20.

The installer, either before or after connecting the leading end 30 of the fitting 20 to the electrical box 111, inserts an electrical cable 115 into the inlet bore 52 at the trailing end 32 of the ninety degree snap fit fitting 20. The cable retaining tangs 94 are biased outwards as the cable 115 is inserted. Electrical cable 115 is inserted until the end 117 of the cable contacts the internal shoulder 60 of the fitting. Internal shoulder 60 thus serves as a limiting means for limiting the distance the cable can be inserted within the fitting. Conductors 119, which have been stripped back to the end 117 of the electrical cable 115, are guided around the outside bend 70 of the smooth inner walls 66 that includes a gentle bend radius R1. The outside bend 70 extends from outer flange 71 to trailing flange 38. Most preferably, the ratio of the radius R1 of the outside bend 70 in relation to the length of the outside bend is at least 0.77, which will provide a gentle bend radius given the length of the outside bend.

After the end 117 of the cable 115 reaches internal shoulder 60, the free ends 101 of the cable retaining tangs 94 snap into one of the grooves 121 of the cable 115, thereby locking the cable securely to the trailing end 32 of the fitting and establishing good electrical continuity between the fitting 20 and the cable, which includes a grounding sheath. As shown in FIG. 12, the cable retaining tangs 94 press the cable 115 firmly toward the outside bend 70 of the cable and establish good surface contact between the cable 115 and the fitting 20 along a substantial length of the walls 123 forming the inlet bore 52 at the trailing end 32 of the ninety degree snap fit electrical fitting 20. The fitting 20 can be used to connect metal clad (MC) cable, armor cable (A/C), health care facility (HCF) cable, and flexible metal conduit (FMC) to electrical boxes or panels and establishes good grounding or electrical continuity between the fitting, the electrical box, and the electrical cable. By virtue of the snap-in connection of the fitting at both the leading end (to the electrical box) and at the trailing end (of the cable to the fitting), the ninety degree snap fit electrical fitting 20 reduces the time required for connecting an electrical cable to an electrical box. By virtue of the gentle bend radius and the action of the cable retaining tangs 94 in guiding the cable to the outside bend 70, cables 115 and their associated conductors 119 are easily passed through the fitting.

To insure resiliency and strength of the associated tangs, snap ring 24 and internal snap ring 26 are most preferably constructed of spring steel. Connector body 22 most preferably is die-cast of metal. As shown in FIG. 12, the electrical insider fitting 20 provides good electrical continuity between the outer sheath of the electrical cable 115, the electrical box 111 and the fitting 20 itself including the snap ring 24, the internal snap ring 26, and the connector body 22. A grounding path is established between the electrical box 111 and the connector body 22 by the flush contact of trailing flange 38 with the electrical box wall and by the locking tangs 78 of the snap ring 24 in contact with the inside wall of the electrical box. The locking tangs 78 of the snap ring 24, being constructed of resilient metal, remain biased against the inside surface of the box 111 and thereby keep trailing flange 38 pressed tight against the box. At the same time, locking tangs 94 of internal snap ring 26 keep the internal snap ring locked within the trailing end 32 of the connector body 22, cable retaining tangs 94 tightly grasp the electrical cable 115, and the internal snap ring 26 maintains a bias against the internal walls of the connector body 22. Thus electrical continuity is established and maintained between the electrical cable 115, the electrical box 111, and the ninety degree snap fit electrical fitting 20.

Figure 13:
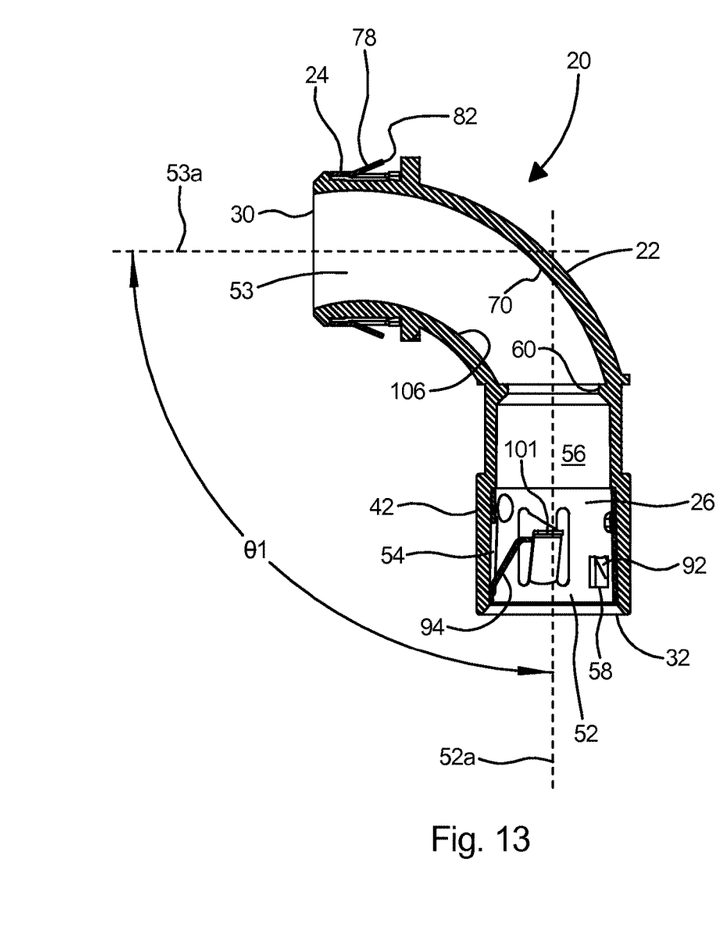
FIG. 13 is a sectional view of the ninety degree snap fit electrical fitting taken along line 9-9 of FIG. 7.
Figure 14:
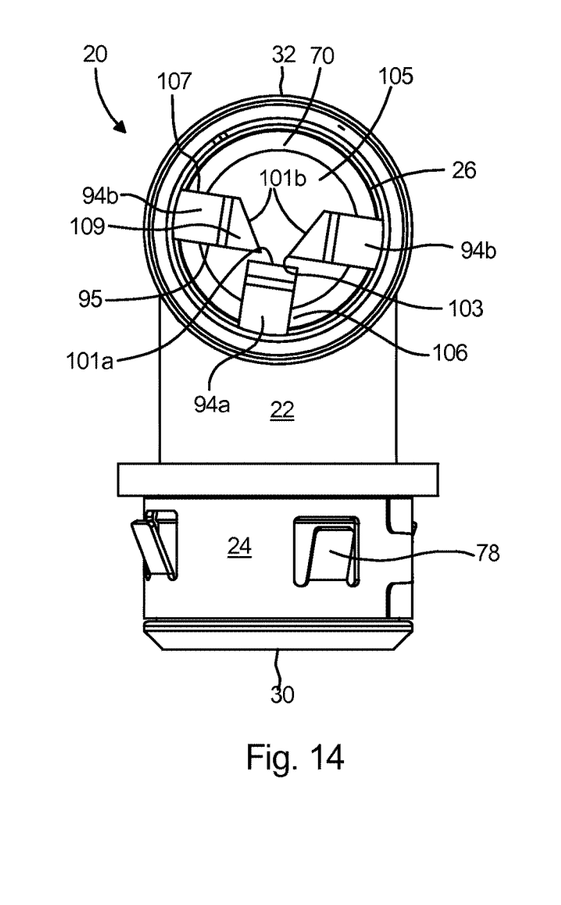
FIG. 14 is an end view of the ninety degree snap fit electrical fitting from the trailing end.

Referring to FIGS. 13 and 14, inlet bore 52 is aligned along inlet axis 52a and outlet bore 53 is aligned along outlet axis 53a. Preferably, the outlet bore 53a is not linear with the inlet axis 52a. Preferably the angle θ1 between the inlet bore 52 and outlet bore 53 is between 60 and 120 degrees, more preferably between 70 and 110 degrees, and most preferably between 80 and 100 degrees. The preferred embodiment includes the inlet bore 52 aligned at an angle of 90 degrees to the outlet bore 53, as shown by the angle θ1 between the inlet bore axis 52a and outlet bore axis 53a as shown in FIG. 13. Thus, as an electrical cable and the wiring leads (see FIG. 12) are inserted into the trailing end 32 of the connector 20, the pusher tang 94a of internal snap ring 26 pushes the cable against the outer bend 70 side of the fitting and the centering tangs 94b internal snap ring 26 keep the cable centered along the outer wall. The outer bend 70 of connector body 22 includes a gentle bend radius to guide the wiring leads through the outlet bore 53 without bunching and thus keeps the wiring leads away from the inside bend 106, which has a much tighter bend radius.

With reference to FIGS. 7-9, the electrical fitting 20 further includes a retaining arrangement 125 for retaining the internal snap ring 26 within the inlet bore 52 of the connector body 22. The retaining arrangement 125 includes a press fit of the internal snap ring 26 within the inlet bore 52 of the connector body, an opening 58 in the connector body 22, and a locking tang 92 (see FIG. 6) extending outward from the internal snap ring 26 through the opening 58 of the connector body 22. The electrical fitting 20 further includes axially aligned openings 131 through the sidewall 48 of the connector body 22 at the second inlet chamber 56. The openings 131 are on the sides of the connector body and thus are located at 90° circumferentially around the connector body 22 from the outside bend 70. The openings 131 are in axial alignment on opposing sides of the walls of the connector body forming the second inlet chamber 56. The openings 131 enable an installer to view into the second inlet chamber 56 so as to insure that the end of the cable has seated against the shoulder 60. As shown in FIG. 9, the shoulder 60 at the end of the second inlet chamber 56 includes a sloped abutment surface 133 for engaging an inserted cable (not shown). The shoulder 60 includes a base 135 and an innermost extent 137 and the shoulder 60 is widest at its base 135 and narrowest at the innermost extent 137.

What is at present considered the preferred embodiment of the present invention has been presented herein for purposes of illustration and description, but is not intended to be exhaustive or limited to the invention in the form disclosed. It will be obvious to those skilled in the art that various changes and modifications may be made therein without departing from the scope of the invention as defined by the appended claims.

What is claimed is:

1. A snap fit electrical fitting, comprises:
    a one-piece connector body including a sidewall, a leading end having a circular outlet bore with an outlet axis, and a trailing end having a circular inlet bore with an inlet axis, said inlet axis and said outlet axis are at an angle to one another;
    a leading flange extending around the periphery of said leading end of said connector body and a trailing flange between said leading end and said trailing end of said connector body;
    said sidewall at said trailing end including a straight sidewall portion including a first inlet chamber and a second inlet chamber, said second inlet chamber including an inner periphery and an interior end;
    a cylindrical sidewall portion extending from said straight wall portion to said leading end;
    an internal shoulder is between said straight sidewall portion and said cylindrical sidewall portion;
    an outer flange is between said trailing flange and said internal shoulder, said outer flange extending from said cylindrical sidewall portion of said connector body;
    an outside bend and an inside bend of said connector body;
    said angle between said inlet bore and said outlet bore is between 60 and 120 degrees;
    a reduced-diameter seat has a constant diameter, and is on said leading end of said connector body, said seat extending from said leading flange to said trailing flange;
    a snap ring is disposed on said seat;
    an internal snap ring is within said first inlet chamber of said connector body;
    a pusher tang is on said inside bend of said snap fit electrical fitting;
    said pusher tang directing a cable inserted within said inlet bore toward said outside bend of said connector body; and
    axially aligned openings extending through the sidewall on the second inlet chamber of the connector body, wherein the axially aligned openings are substantially orthogonal to a part of the straight side wall portion connecting to the outside bend.

2. The snap fit electrical fitting of claim 1, comprising a sloped abutment surface of the internal shoulder.

3. The snap fit electrical fitting of claim 1, comprising:
    two centering tangs of the internal snap ring, said two centering tangs including edges; and
    said centering tangs including flat free ends.

4. The snap fit electrical fitting of claim 1, comprising:
    the flat free ends of the centering tangs are at an angle with respect to the edges of the centering tangs;
    a point of the free ends of the centering tangs; and an open area in the internal snap ring.

* * * * *